(12) United States Patent
Wimmer

(10) Patent No.: US 8,344,736 B2
(45) Date of Patent: Jan. 1, 2013

(54) IDENTIFYING IMPROPER CABLING OF DEVICES

(75) Inventor: Wolfgang Wimmer, Rietheim (CH)

(73) Assignee: ABB Technology AG, Zürich (CH)

( * ) Notice: Subject to any disclaimer, the term of this patent is extended or adjusted under 35 U.S.C. 154(b) by 454 days.

(21) Appl. No.: 12/684,649

(22) Filed: Jan. 8, 2010

(65) Prior Publication Data

US 2010/0110904 A1 May 6, 2010

Related U.S. Application Data

(63) Continuation of application No. PCT/EP2008/057920, filed on Jun. 23, 2008.

(30) Foreign Application Priority Data

Jul. 9, 2007 (EP) .................................... 07112089

(51) Int. Cl.
*H01H 31/02* (2006.01)

(52) U.S. Cl. ....................................................... 324/555

(58) Field of Classification Search .................. 324/555, 324/500, 537, 538, 539, 543, 66; 370/241, 370/242, 245, 248
See application file for complete search history.

(56) References Cited

U.S. PATENT DOCUMENTS

| | | | |
|---|---|---|---|
| 7,737,701 B2 * | 6/2010 | Williamson et al. | 324/527 |
| 7,760,658 B2 * | 7/2010 | Wall et al. | 370/248 |
| 2004/0061486 A1 | 4/2004 | Peeke et al. | |
| 2005/0060372 A1 * | 3/2005 | DeBettencourt et al. | 709/206 |

OTHER PUBLICATIONS

DIN: "DIN IEC 62439, (Draft) Digital data communication for measurement and control—High availability automation networks" Entwurf, 2007, pp. 1-138, XP008087015.
International Search Report (PCT/ISA/210) for PCT/EP2008/057920 mailed Sep. 22, 2008.
International Preliminary Report on Patentability (PCT/IPEA/409) for PCT/EP2008/057920 dated Jul. 16, 2009.
European Search Report for EP 07112089.3 dated Jan. 11, 2008.
S. Meier, "Doppelt gemoppelt hält besser! PRP—Parallel Redundancy Protocal, Redundanzkonzept ohne Umschaltung, (Committee Draft IEC 62439, Kap. 6)" [Online], Jan. 25, 2007, pp. 1-36, XP002462282.

* cited by examiner

*Primary Examiner* — Hoai-An D Nguyen
(74) *Attorney, Agent, or Firm* — Buchanan Ingersoll & Rooney PC

(57) ABSTRACT

Systems and methods are disclosed for identifying improper cabling of control system devices connected to redundant communication networks of distributed control systems. In an embodiment, a receiving device receives messages including a sender identification or source address, and a network or associated device port identification, from sending devices, over redundant networks. The receiving device determines a connect status indicating whether a message was received on a particular device port, and an error event indicating whether the port is associated with the network identified in the message. A system diagnoses an improper communication path between devices and produces an indication of a location and/or type of improper cabling. A method supplants error events with error rates calculated as a probability of receiving messages on a device port not associated with the network identified in a received message. The method compares the error rates to error thresholds to identify improper cabling.

8 Claims, 1 Drawing Sheet

| # | supervising device | | supervised device | | error rates | | mute status | | signature |
|---|---|---|---|---|---|---|---|---|---|
|   | wrong A | wrong B | wrong A | wrong B | errA | errB | mute A | mute B |   |
| 0 | 0 | 0 | 0 | 0 | 0 | 0 | 1 | 1 | OK |
| 1 | 0 | 0 | 0 | 1 | 50 | 0 | 1 | 0 | 1 |
| 2 | 0 | 0 | 1 | 0 | 0 | 50 | 0 | 1 | 2 |
| 3 | 0 | 0 | 1 | 1 | 100 | 100 | 1 | 1 | 3 |
| 4 | 0 | 1 | 0 | 0 | 0 | 100 | 1 | 1 | 4 |
| 5 | 0 | 1 | 0 | 1 | 50 | 50 | 1 | 1 | 5 |
| 6 | 0 | 1 | 1 | 0 | 0 | 0 | 0 | 0 | 6 |
| 7 | 0 | 1 | 1 | 1 | 100 | 0 | 1 | 1 | 7 |
| 8 | 1 | 0 | 0 | 0 | 100 | 0 | 1 | 1 | 7 |
| 9 | 1 | 0 | 0 | 1 | 0 | 0 | 0 | 0 | 6 |
| 10 | 1 | 0 | 1 | 0 | 50 | 50 | 1 | 1 | 5 |
| 11 | 1 | 0 | 1 | 1 | 0 | 100 | 1 | 1 | 4 |
| 12 | 1 | 1 | 0 | 0 | 100 | 100 | 1 | 1 | 3 |
| 13 | 1 | 1 | 0 | 1 | 0 | 100 | 0 | 1 | 8 |
| 14 | 1 | 1 | 1 | 0 | 100 | 0 | 1 | 0 | 9 |
| 15 | 1 | 1 | 1 | 1 | 0 | 0 | 1 | 1 | OK? |

IDENTIFYING IMPROPER CABLING OF DEVICES

RELATED APPLICATIONS

This application claims priority as a continuation application under 35 U.S.C. §120 to PCT/EP2008/057920, which was filed as an International Application on Jun. 23, 2008 designating the U.S., and which claims priority to European Application 07112089.3 filed in Europe on Jul. 9, 2007. The entire contents of these applications are hereby incorporated by reference in their entireties.

FIELD

The disclosure relates to the field of industrial communication systems with redundant communication networks, such as substation automation systems.

BACKGROUND INFORMATION

In industrial communication networks of distributed control systems, reliability or availability can be a key issue, because a failing communication network can entail an interruption of the control system eventually leading to a shut down of the controlled industrial process. Therefore, communication network redundancy can be an important feature of all industrial control systems demanding high availability, such as Ethernet based communication with commercial switches or where one of the redundant networks is an existing network like the Internet.

In order to prevent wrong or improper cabling of redundant networks to the ports of a device of the control system, dedicated designs of the plugs for the different networks or a color-coding of cables and plugs to facilitate visual inspection can be envisaged. However, these methods can involve an additional engineering effort, generate additional cost for tailor-made parts, and can be incompatible with commercial off-the-shelf components or already existing communication networks.

Alternatives can rely on an identification of the ports of the device and/or the redundant networks to which the ports are assigned, and include this identification in a message sent through the network. The patent application publication US2004061486 discloses a way of detecting improper cabling in a system having boards within a computer or memory system, which boards are connected by redundant backend networks or communication loops. Messages identifying, by a backend identifier or loop ID, a redundant backend network are spread by a host processor and evaluated in order to determine whether or not all the boards are connected to the same redundant backend network. This method is specific for loop topologies serially interconnecting neighboring boards. The identification of an individual wrongly connected port involves user intervention and starts with an investigation of the nearest board to the host processor signaling a wrong cabling.

Substations in high and medium-voltage power networks include primary devices such as electrical cables, lines, bus bars, switches, power transformers and instrument transformers, which can be arranged in switch yards and/or bays. These primary devices can be operated in an automated way via a Substation Automation (SA) system. The SA system can include microprocessor based, programmable secondary devices, so-called Intelligent Electronic Devices (IED) responsible for protection, control and monitoring of the primary devices. The IEDs can be assigned to one of three hierarchical levels, i.e. the station level, the bay or application level, and the process level being separated from the bay level by a process interface. The station level of the SA system includes an Operator Work Station (OWS) with a Human-Machine Interface (HMI) and a gateway to a Network Control Centre (NCC). IEDs on the bay level, also termed bay units, in turn can be connected to each other and to the IEDs on the station level via an inter-bay or station bus. The communication network connection points of the latter, i.e. the (ports of the) Ethernet switches to which the various application and station level IEDs are connected, can have a relatively short Mean Time To Failure (MTTF). Hence, each IED is connected, via two distinct ports to two distinct and hence redundant communication networks as physical communication channels (managed according to Parallel Redundancy Protocol PRP), or to two distinct switches in a ring configuration (managed e.g. according to Rapid Spanning Tree Protocol RSTP, or to IEC 62439 Media Redundancy Protocol MRP).

In contrast to direct cable connections as in the communication loops mentioned above, communication networks or buses can include a plurality of access points or switches from which cables connect to the devices of the control system, i.e. to their ports and communication circuits. In addition to diagnosing a link between two devices having a wrong cabling that jeopardizes the wanted redundancy, an identification of the exact location (device and port) of an improper connection can be desired. This identification may include an indication if only one port is connected or if both ports are connected to the same network, or if both ports are cross-connected to the wrong networks.

SUMMARY

A method of identifying improper cabling of devices connected to redundant communication networks is disclosed, comprising: establishing, by a receiving device, a first connect status depending on whether or not a receiving port of the receiving device receives a message from a first sending device; receiving, via a receiving port of the receiving device, a message from the first sending device, and establishing a first error event depending on whether or not an identifier of the receiving port matches a network identifier of the received message; establishing, by the receiving device, a second connect status depending on whether or not a receiving port of the receiving device receives a message from a second sending device; receiving, via a receiving port of the receiving device, a message from the second sending device, and establishing a second error event depending on whether or not an identifier of the receiving port matches a network identifier of the received message; and identifying an improper cabling at the receiving device and/or at least one of the first and second sending devices based on the first and second connect status and first and second error events.

A device for identifying improper cabling of devices connected to redundant communication networks is disclosed, comprising: means for establishing a first and second connect status depending on whether or not the device receives a message from a first and/or second sending device; a receiving port for receiving a message from the first and/or second sending device, for establishing a first or second error event depending on whether or not an identifier of the receiving port matches a network identifier of the received message; and cabling at the device and/or at least one of the sending devices, the device identifying the improper cabling based on the first and the second connect status and the first and second error events.

A computer program is disclosed for identifying improper cabling of devices connected to redundant communication networks, which is loadable in and executable on a data processing unit and which computer program performs, when being executed by one or more communicating data processing units, a method comprising: establishing, by a receiving device, a first connect status depending on whether or not a receiving port of the receiving device receives a message from a first sending device; receiving, via a receiving port of the receiving device, a message from the first sending device, and establishing a first error event depending on whether or not an identifier of the receiving port matches a network identifier of the received message; establishing, by the receiving device, a second connect status depending on whether or not a receiving port of the receiving device receives a message from a second sending device; receiving, via a receiving port of the receiving device, a message from the second sending device, and establishing a second error event depending on whether or not an identifier of the receiving port matches a network identifier of the received message; and identifying an improper cabling at the receiving device and/or at least one of the first and second sending devices based on the first and second connect status and first and second error events.

BRIEF DESCRIPTION OF THE DRAWINGS

The subject matter of the disclosure will be explained in more detail in the following text with reference to exemplary embodiments which are illustrated in the attached drawings, in which.

Figures 1, 2:
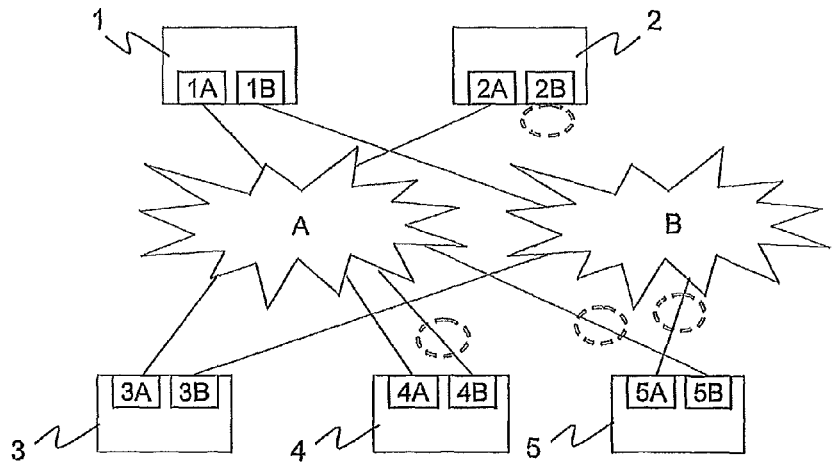
FIG. 1 schematically shows an exemplary communication system with two redundant networks.
FIG. 2 is a table enumerating exemplary failure situations of a communication link.

The reference symbols used in the drawings, and their meanings, are listed in summary form in the list of reference symbols.

DETAILED DESCRIPTION

An exemplary system and method are disclosed which can identify, with a high probability, incorrect cable connections of control system devices connected to redundant communication networks.

As proposed in standard IEC 62439 (Parallel Redundancy Protocol PRP), messages including a sender identification or source address as well as network or associated device port identification are transmitted from a sending device to a receiving device over redundant networks. The receiving or destination device can determine a connect status indicating whether or not a message has been received on a particular device port, as well as an error event indicating whether or not the device port is associated to the network identified in the received message. By doing so for at least two distinct sending devices, the exemplary embodiments can produce, in addition to diagnosing an improper communication path between two devices, an indication as to the location and/or type of wrong cabling.

In exemplary variants, single error events can be supplanted by error rates calculated as a probability of receiving messages on a device port not associated to the network identified in the received message and compared to error thresholds for the purpose of identifying improper cabling. As some messages might be delayed on one port more than on another, or might be missing due to temporary disturbances in some network, reverting to probabilities can prevent singular messages from faking a particular failure situation and wrong conclusions being drawn.

An exemplary method as disclosed herein can be used with standard, off-the-shelf communication networks like switch based Ethernet systems or Internet, and standardized protocols such as TCP/IP protocol, and does not necessitate any hardware modifications. An automated and correct diagnosis of the wrongly connected port(s) of up to two devices is possible, and a correct diagnosis in many situations where even more devices are wrongly connected can also be achieved.

Exemplary embodiments can be applied to Substation Automation (SA) systems, for which supervising Intelligent Electronic Devices (IED) as the receiving devices are configured for various purposes by means of an IEC 61850 SCL configuration file. Apart from Substation Automation, it will be apparent to those skilled in the art that the principles and methods disclosed herein are likewise applicable to other automation systems with a standardized configuration description, such as wind power, hydro power, Distributed Energy Resources (DER) and so forth.

The code of a computer program for carrying out all or some of the steps according to the disclosure may be stored in a computer program product, e.g. in a computer readable medium, either in the memory of a computer or other device for performing the steps, or on any data carrier that can be inserted into or used with the computer or device.

FIG. 1 shows an exemplary communication system with five devices 1-5 interconnected via two redundant communication networks A, B. In the configuration depicted, the devices 1 and 3 are properly connected, by means of a terminal cable between each of their respective device ports 1A, 1B; 3A, 3B to the associated network. On the other hand, port 2B of device 2 is not connected at all, port 4B of device 4 is erroneously connected to network A instead of network B, and ports 5A and 5B of device 5 are cross-connected to the respective wrong network (dashed circles). Exemplary communication links or paths of the system include first cable connections between a first device and the communication networks, and second cable connections between a second device and the communication networks. As depicted, either one or both of the first and second cable connections can include one or two improper or wrong cablings.

According to the standard IEC 62439 related to industrial communication via Parallel Redundancy Protocol (PRP), any message is sent across each of the two redundant communication networks and includes an identification of the network or channel to which the sending port is assigned, i.e. either network A or network B, in addition to the source and destination IP addresses of each normal IP level message. At a device receiving a message, standard supervision procedures then monitor if and what messages arrive on its network A and on its network B.

FIG. 2 is an exemplary table enumerating 16 possible failure situations of a particular link or path between a supervised and a supervising device as defined by combining wrong port connections at the supervisory device with wrong port connections at the supervised device (columns 2 to 5). It is assumed that a complete disconnection of a cable at either one of the devices can be detected by other means, e.g. by the end-end supervision of the communication link. Columns 6 and 7 show resulting error rates errA, errB per receiving port at the supervising device defined as the ratio of the messages received via a wrong network to the total number of messages received from the supervised device. The connect status conA, conB (columns 8 and 9) indicates if any messages from the supervised device arrive at all at the respective port. As shown in the last column, the combination of error rate and connect status allows identifying 10 distinct signatures for the 16 failure situations. Of these, the signatures numbered 1, 2, 8 and 9 are unambiguously assignable to a single failure situation.

An error rate as reported in FIG. 2, i.e. the ratio of erroneous to all messages for a particular port, in theory adopts one out of at least three values (0, 50, 100). In reality the resulting rate, as an average of a plurality of error events related to individually received messages, will fluctuate about these values due to temporary transmission errors Therefore, appropriate error thresholds (e.g. <25, 25-75, >75) defining respective probability zones can be set.

The actual error rates can then be compared to these error thresholds in order to identify a signature.

In order to distinguish the remaining ambiguous signatures and identify the underlying failure situations, the results of several, i.e. at least two, supervised devices can be compared (e.g., at the supervising device). If they all indicate a wrong connection at the supervising device (e.g., by displaying the same or a comparable non-zero errA or errB rate), then the failure is with high probability at the supervising device. If there is a supervised device with error rate 0 and connect status 1 at a particular port, and another supervised device exhibits a higher error rate, then the failure is assumed to be at the other supervised device. This allows discriminating the signatures numbered 3, 4, 5, 6 and 7 as well as the first and last failure situation, the result being unambiguous and corresponding to the actual situation with a high probability. If desired, accuracy can be increased by including failure situations from still further communication paths linking a supervising and a supervised device.

In terms of Substation Automation (SA), each Intelligent Electronic Device (IED) redundantly connected to the communication networks is either a supervising IED (e.g. a bay level IED for protection and control at the bay level) or a supervised IED (e.g. a station level IED). The corresponding functionality is part of the SA configuration data as included, for example, in a Substation Configuration Description (SCD) or a Configured IED Description (CID) file. The latter files can be encoded in a Standardized Configuration description Language (SCL) based on an XML schema according to the IEC 61850 standard for substation communication. Configuration data related to individual IEDs and including their addresses, their physical connection to the communication network A or B, the application functions and their supervision capabilities can direct the configuration of the IED by a system engineering tool. For example, each bay level IED can be automatically configured to supervise between 3 to 5 station level (supervised) IEDs and to appropriately disseminate the resulting decisions related to improper cabling.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Designations 1 to 5 Devices in an industrial communication or control system
A, B Redundant communication networks
1A to 5A Device ports assigned to network A
1B to 5B Device ports assigned to network B

What is claimed is:

1. A method for identifying improper cabling of devices connected to redundant communication networks, the method comprising:
in response to receiving, via a receiving port of a receiving device, from a first sending device, a message including a network identifier, establishing, by the receiving device, a first connect status;
in response to determining that an identifier of the receiving port does not match the network identifier, establishing a first error event;
in response to receiving, via the receiving port of the receiving device, from a second sending device, a second message including a network identifier, establishing, by the receiving device, a second connect status;
in response to determining that the identifier of the receiving port does not match the network identifier of the second message, establishing a second error event; and
identifying an improper cabling at the receiving device and/or the first sending device, or the second sending device based on one or more of:
the first connect status;
the second connect status;
the first error event; and
the second error event.

2. The method according to claim 1, comprising:
receiving, via at least one receiving port of the receiving device, a plurality of messages from the first and/or second sending devices;
determining, for each receiving port, a first and second error rate related to a number of error events established for the plurality of messages received from the first and/or second sending devices; and
identifying an improper cabling at the receiving device and/or one of the first and second sending devices based on the first and second error rates.

3. The method according to claim 2, comprising:
identifying an improper cabling at the receiving device and/or at least one of the first and second sending devices by comparing the first and/or second error rates with error thresholds.

4. The method according to claim 1, wherein the redundant communication networks are part of a Substation Automation (SA) system.

5. The method according to claim 4, comprising:
configuring the receiving device and the first and/or second sending devices as supervising and supervised Intelligent Electronic Devices (IED) by an IEC 61850 SCL configuration file.

6. A device for identifying improper cabling of devices connected to redundant communication networks, the device comprising:
means for establishing a first connect status and/or a second connect status in response to receiving, at the device, a message including a network identifier from a first sending device and/or a second sending device;
a receiving port for establishing a first error event and/or a second error event in response to determining that an identifier of the receiving port does not match a network identifier of the received message; and
cabling connected to at least one of the device, the first sending device, or the second sending device,
wherein the device is configured to identify an improper cabling based on one or more of:
the first connect status;

the second connect status;
the first error event; and
the second error event.

7. The device according to claim 6, comprising:
an IEC 61850 SCL configuration file for configuring the device as a supervising Intelligent Electronic Device (IED).

8. A computer readable storage medium having stored thereon, program instructions for identifying improper cabling of devices connected to redundant communication networks, that, if executed by one or more communicating data processing units, cause the data processing units to perform operations comprising:
in response to receiving, via a receiving port of a receiving device, from a first sending device, a message including a network identifier, establishing, by the receiving device, a first connect status;
in response to determining that an identifier of the receiving port does not match the network identifier, establishing a first error event;
in response to receiving, via the receiving port of the receiving device, from a second sending device, a second message including a network identifier, establishing, by the receiving device, a second connect status;
in response to determining that the identifier of the receiving port does not match the network identifier of the second message, establishing a second error event; and
identifying an improper cabling at the receiving device and/or the first sending device, or the second sending device based on one or more of:
the first connect status;
the second connect status;
the first error event; and
the second error event.

* * * * *